United States Patent
Bailey

(10) Patent No.: US 11,085,737 B2
(45) Date of Patent: Aug. 10, 2021

(54) METHODS OF USING A DEFENSE STRUCTURE

(71) Applicant: Proactive Ballistic Systems, LLC, South Hutchinson, KS (US)

(72) Inventor: Robert D. Bailey, McPherson, KS (US)

(*) Notice: Subject to any disclaimer, the term of this patent is extended or adjusted under 35 U.S.C. 154(b) by 0 days.

(21) Appl. No.: 16/865,017

(22) Filed: May 1, 2020

(65) Prior Publication Data

US 2020/0271426 A1 Aug. 27, 2020

Related U.S. Application Data

(62) Division of application No. 16/268,054, filed on Feb. 5, 2019, now Pat. No. 10,648,777.

(60) Provisional application No. 62/626,563, filed on Feb. 5, 2018.

(51) Int. Cl.
| | |
|---|---|
| B32B 3/14 | (2006.01) |
| F41H 5/02 | (2006.01) |
| F41H 5/04 | (2006.01) |
| B32B 3/30 | (2006.01) |
| B32B 3/06 | (2006.01) |
| F41H 5/24 | (2006.01) |

(52) U.S. Cl.
CPC ............ *F41H 5/023* (2013.01); *F41H 5/0407* (2013.01); *B32B 3/06* (2013.01); *B32B 3/30* (2013.01); *B32B 2307/558* (2013.01); *B32B 2571/02* (2013.01); *F41H 5/0464* (2013.01); *F41H 5/0478* (2013.01); *F41H 5/24* (2013.01); *Y10T 428/24174* (2015.01)

(58) Field of Classification Search
CPC ....... Y10T 428/24174; Y10T 29/49826; F41H 5/026; F41H 5/023; F41H 5/0471; B32B 3/14; B32B 3/16
See application file for complete search history.

(56) References Cited

U.S. PATENT DOCUMENTS

| | | | | |
|---|---|---|---|---|
| 4,727,789 A | * | 3/1988 | Katsanis | .................. F41H 5/023 109/49.5 |
| 2009/0114083 A1 | | 5/2009 | Moore, III et al. | |
| 2010/0300275 A1 | | 12/2010 | Warren | |
| 2011/0067561 A1 | * | 3/2011 | Joynt | ...................... F41H 5/023 89/36.02 |
| 2011/0239851 A1 | | 10/2011 | Mason et al. | |
| 2012/0125187 A1 | | 5/2012 | Hunn | |
| 2016/0040961 A1 | | 2/2016 | Kovalev | |
| 2016/0209178 A1 | | 7/2016 | Bailey et al. | |
| 2017/0102216 A1 | | 4/2017 | Lam | |
| 2017/0226891 A1 | | 8/2017 | Twelves, Jr. et al. | |

* cited by examiner

*Primary Examiner* — Alexander S Thomas

(74) *Attorney, Agent, or Firm* — Spencer Fane LLP

(57) ABSTRACT

A ballistic resistant material and structure and methods for allowing and preventing projectiles from passing through the ballistic resistant defense structure. The ballistic resistant defense structure involves a ballistic multilayer arrangement comprised of V-Profiles 100 which are further comprised of V-shaped wedges arranged adjacent to each other, spaced slightly apart, with gaps. The gaps between the V-shaped wedges expand or contract depending on which side of the V-Profile a projectile strikes.

12 Claims, 9 Drawing Sheets

METHODS OF USING A DEFENSE STRUCTURE

CROSS REFERENCE TO RELATED APPLICATIONS

The present non-provisional patent application is a divisional application which claims priority of an earlier-filed patent application titled PRO-ACTIVE DEFENSE STRUCTURE, Ser. No. 16/268,054, filed Feb. 5, 2019, now U.S. Pat. No. 10,648,777, which claims priority of an earlier-filed provisional patent application titled PROACTIVE DEFENSE STRUCTURE, Ser. No. 62/626,563, filed Feb. 5, 2018. The contents of the identified earlier-filed applications are hereby incorporated by reference into the present application.

FIELD OF THE DISCLOSED SUBJECT MATTER

The present invention and disclosed subject matter relate generally to ballistic resistant materials and structure and, more particularly, to ballistic multilayer arrangements that resist various projectiles on one side of the arrangement while allowing other projectiles to pass easily through on another side of the arrangement.

BACKGROUND

Conventional safe rooms and other ballistic resistant structures are typically constructed of massive concrete or extremely costly materials, high density fiberglass panels are also being used. These types of materials inhibit projectiles from passing through the wall or door structure in either direction. The idea is to inhibit direct access to a victim from an assailant. However, in this standoff defenders cannot come and go as they wish. The safe room itself becomes a prison from where there is no escape and from where a defender cannot fire back. The defender is temporarily safe, but is no threat to the assailant and is held captive by the assailant within the "safe" room. This allows the assailant additional time to take drastic, pro-active measures to defeat the structure of the safe room. Moreover, safe rooms are typically located in a remote location within a building or home. During an invasion of the property a defender and others must get to the safe room in the remote location before being harmed or captured.

Current systems seldom provide entire rooms within a home that are ballistic resistant; nor entire commercial structures; nor can current systems provide ballistic resistant external panels of automobiles, armored vehicles, and/or aviation equipment or vehicles. Furthermore, current systems cannot enable defenders or victims to fire projectiles at assailants standing on the outside or opposite side of a "bullet proof" room or defense structure, thereby enabling a defender to no longer be held captive in safe rooms, but enabling the defender to pro-actively pick and choose whether they want to end the standoff with deadly force or with disabling effects on the assailants.

SUMMARY

The present invention is directed to ballistic resistant defense structures comprising V profiles, which further comprise V-shaped wedges arranged sideways, adjacent to each other in a V column-type configuration; wherein the V-shaped wedges are spaced slightly apart with slight gaps between each V-shaped wedge; and an outside ballistic receptor or deflector of the profile that runs flush against and parallel to the length of the V column-type configuration.

In one embodiment of this invention, the V-shaped wedges are arranged straight up side by side in horizontal or vertical V row-type configurations. In another embodiment, the outside ballistic receptor of the profile is comprised of fiberglass ballistic materials, while in other embodiments the outside receptor of the profile is comprised of other polymers and/or viscous materials.

In a further embodiment, the fiberglass side of the defense structure has the capability to prevent a projectile that is shot from the fiberglass side towards the V-profile side, from passing all the way through the defense structure. In some embodiments the defense structure absorbs a portion of or the entire projectile and in other embodiments the defense structure deflects the projectile entirely.

In yet a further embodiment, the V-profile side of the defense structure has the capability to allow a projectile that is shot from the V-profile side towards the fiberglass side, to pass through the defense structure. The V-shaped wedges yield to the force of the projectile as it impacts the V-profile, creating bigger cavities for immediate following projectiles to also pass through. Additionally, the defense structure is partially self-healing when projectiles impact and enter the defense structure from the V-profile side and exit via the fiberglass side.

In embodiments of the invention, the slight gaps between each V-shaped wedge are approximately 0.0-0.50 inches wide in their normal and un-impacted state. Once a projectile is shot from the V-profile side, through the V-profile side, and towards the fiberglass side, the V-profile shaped wedges yield to the force of the projectile and create wider gaps that are approximately 0.01-0.50 inches wide.

In a further embodiment, the top edges, or wedge prongs, of the V in the V-shaped wedge are bent inwards at an angle slightly, towards the center of the V-shaped wedge. In another embodiment, the material lying across the top of the V-shaped wedge is slightly and concavely curved inwards towards the bottom tip of the V, forming a slight hollow space in between the outside receptor of the V-profile and each V-shaped wedge. In further embodiments, the material lying across the top of the V-shaped wedge is a flat hardened material that lays parallel and flush against the outside receptor of the V-profile and each wedge is filled with a ballistic deflecting polymer.

In yet another embodiment of the invention, the sidewalls of the V-shaped wedges have the capability to flex inward or outward.

In yet another embodiment of the invention, it is recommended that the ballistic resistant defense structure be replaced after being shot at once or after going through repeated back and forth fire.

Thus an object of the present invention is to provide a defense structure that deflects or absorbs and stops ballistics from passing through the defense structure on one side, while allowing projectiles fired from the opposite side to pass through the defense structure.

BRIEF DESCRIPTION OF THE DRAWINGS

The invention will now be illustrated in more detail, but not limited, by reference to the specific embodiment shown in the accompanying drawings, with greater emphasis being placed on clarity rather than scale.

DETAILED DESCRIPTION

Figure 1:
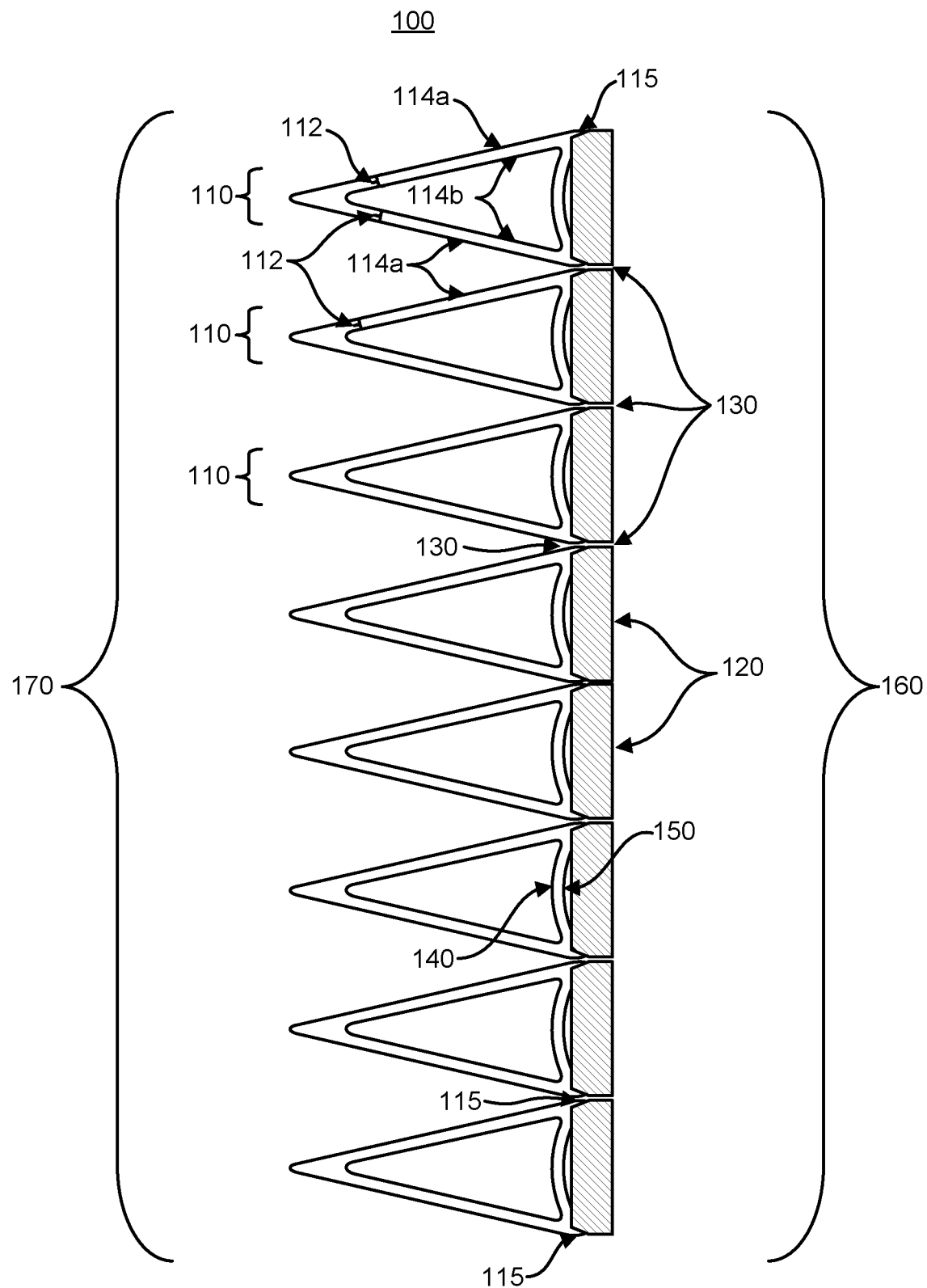
FIG. 1 is a perspective view of a V-Profile in a column-type configuration.

It is to be understood that while certain aspects of the disclosed subject matter have been shown and described, the disclosed subject matter is not limited thereto and encompasses various other embodiments and aspects. Furthermore, certain terminology will be used in the following description, and are shown in the drawings, and will not be limiting. For example, up, down, front, back, right and left refer to the disclosed subject matter as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

The disclosed subject matter will now be described with reference to the drawing figures, in which like reference numerals refer to like parts throughout. For purposes of clarity in illustrating the characteristics of the present disclosed subject matter, proportional relationships of the elements have not been maintained in the figures. In some cases, the sizes of certain small components have been exaggerated for illustration.

The present invention and disclosed subject matter relate generally to ballistic resistant defense structures and more particularly to ballistic multilayer arrangements that defend against ballistics and other projectiles on one side of the arrangement while allowing ballistics or other projectiles to pass through on another side of the arrangement.

Figure 2A:
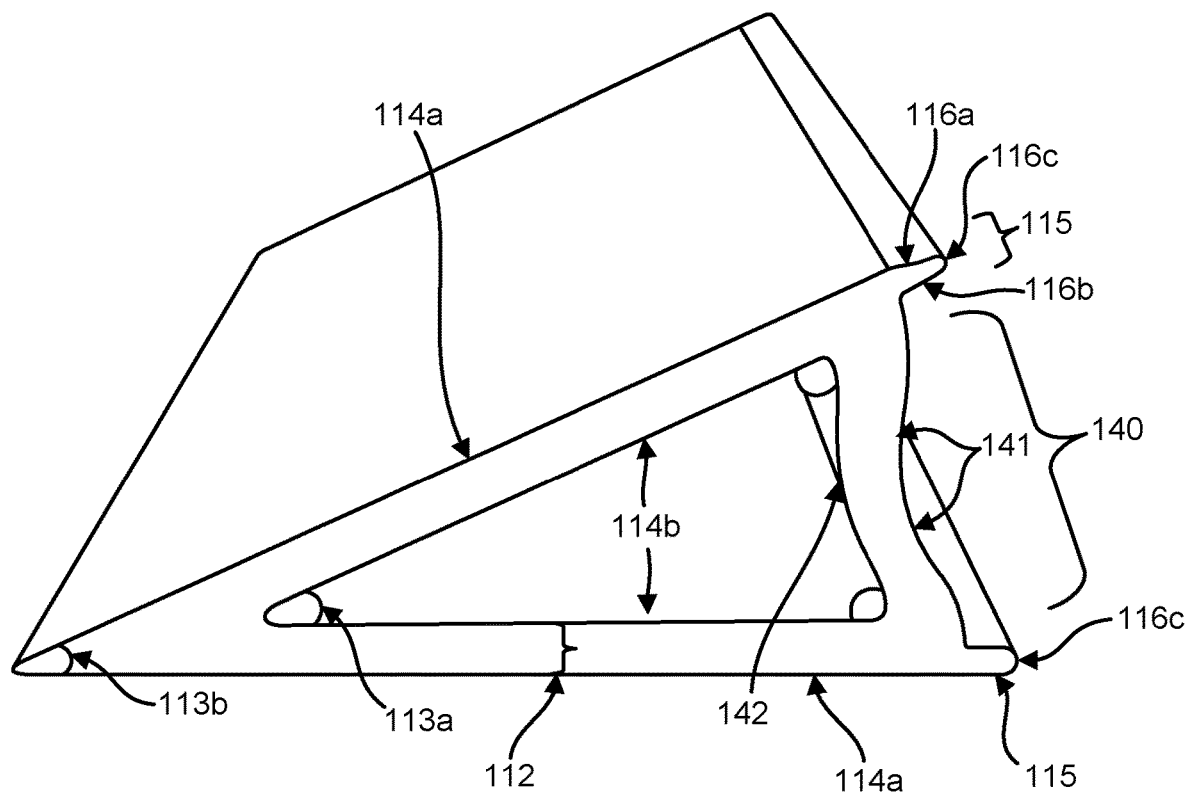
FIG. 2(a) is a perspective view of a V-shaped wedge laying sideways with the top of the V-shaped wedge curved inwards slightly towards the bottom end of the V.
Figure 2B:
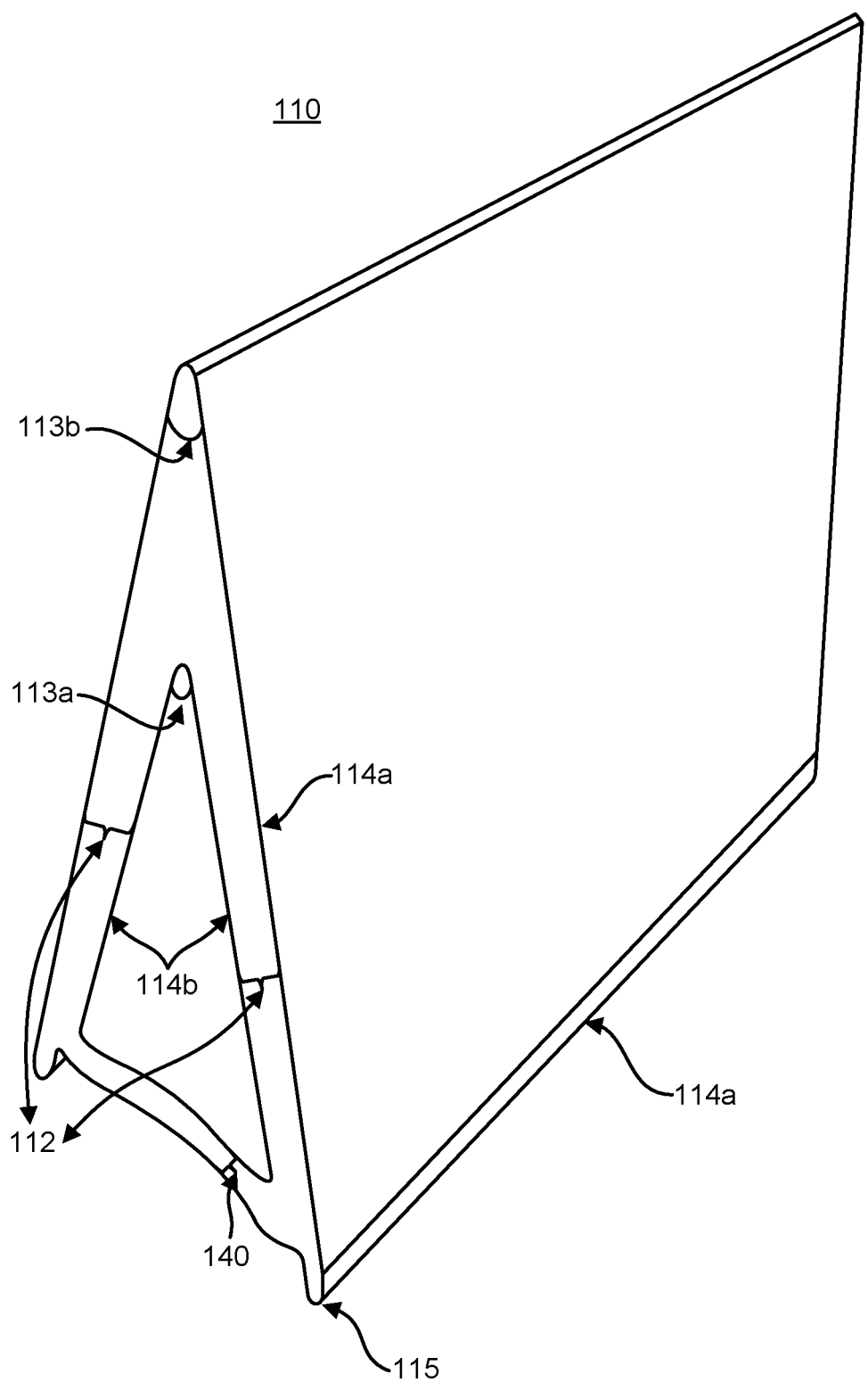
FIG. 2(b) is another perspective view of a V-shaped wedge standing up.

In FIG. 1 a perspective side view of an embodiment of a V-Profile 100 in a column-type configuration according to the invention is represented. The first component of the V-Profile 100 comprises V-shaped wedges 110 arranged sideways adjacent to each other in a V column-type configuration. FIG. 2(a) depicts a close up end view of the V-shaped wedge 110. FIG. 2(b) depicts a close up side view of the V-shaped wedge 110. Each V-shaped wedge 110 is comprised of two rectangular side walls 112 that connect to each other at one of the longer sides of each of the two rectangular side walls 112, to form a V. The side walls 112 are approximately 0.03-0.250 inches thick. Therefore once connected to form a V, the V connection area of the two side walls 112 has an inner radian 113(a) and an outer radian 113(b). The inner radian 113(a) is approximately R.040-R0.060 inches; and the outer radian 113(b) is approximately R0.021-R.0.041 inches. Again because of the thickness of the side walls 112, once connected to form a V, the measurements for the outside perimeter walls 114(a) of the V-shaped wedge 110 varies from the measurements for the inner perimeter walls 114(b) of the V-shaped wedge 110. The measurements for the outer side walls 114(a) are each approximately 3.00-3.054 inches high and approximately 47-49 inches long. The measurements for the inner side walls 114(b) are each approximately 1.887-1.907 inches high and approximately 47-49 inches long. Extending out from the longer, free/non-connected side of each of the side walls 112 are protruding horns or wedge prongs 115. The wedge prongs 115 are approximately 0.0625-0.167 inches high and approximately 47-49 inches long, and taper in thickness from 0.062-0.092 inches thick to 0.010-0.030 inches thick. The thicker parts of the wedge prongs 115 are the ends of the prongs 115 that are connected to and/or extend from the sidewalls 112, and the wedge prongs 115 narrows in thickness as it extends out. The outer walls 116 (a) of the wedge prongs 115 bend inwards slightly towards the center of the V-shaped wedge 110 at approximately R0.010-R0.030 inches. The inner walls 116 (b) of the wedge prong 115 bend outward slightly away from the center of the V-shaped wedge 110 at approximately 4 deg.-8 deg. The outer 116 (a) and inner 116 (b) walls of the wedge prong 115 narrow in to a tip 116 (c) that has a radian of approximately R0.005-R0.020 inches.

The second component of the V-Profile 100 comprises the outside receptor 120 of the profile. In one embodiment, the fiberglass ballistic material is set within the outside receptor 120. The first and second components make up the core of objects created, such as doors, walls, floors, vehicle components, etc. In another embodiment the two components make up a typical residential or commercial wall section 3.250-4.750 inches thick or greater (not including the exterior material like a drywall, just the V-profile components).

Figure 3:
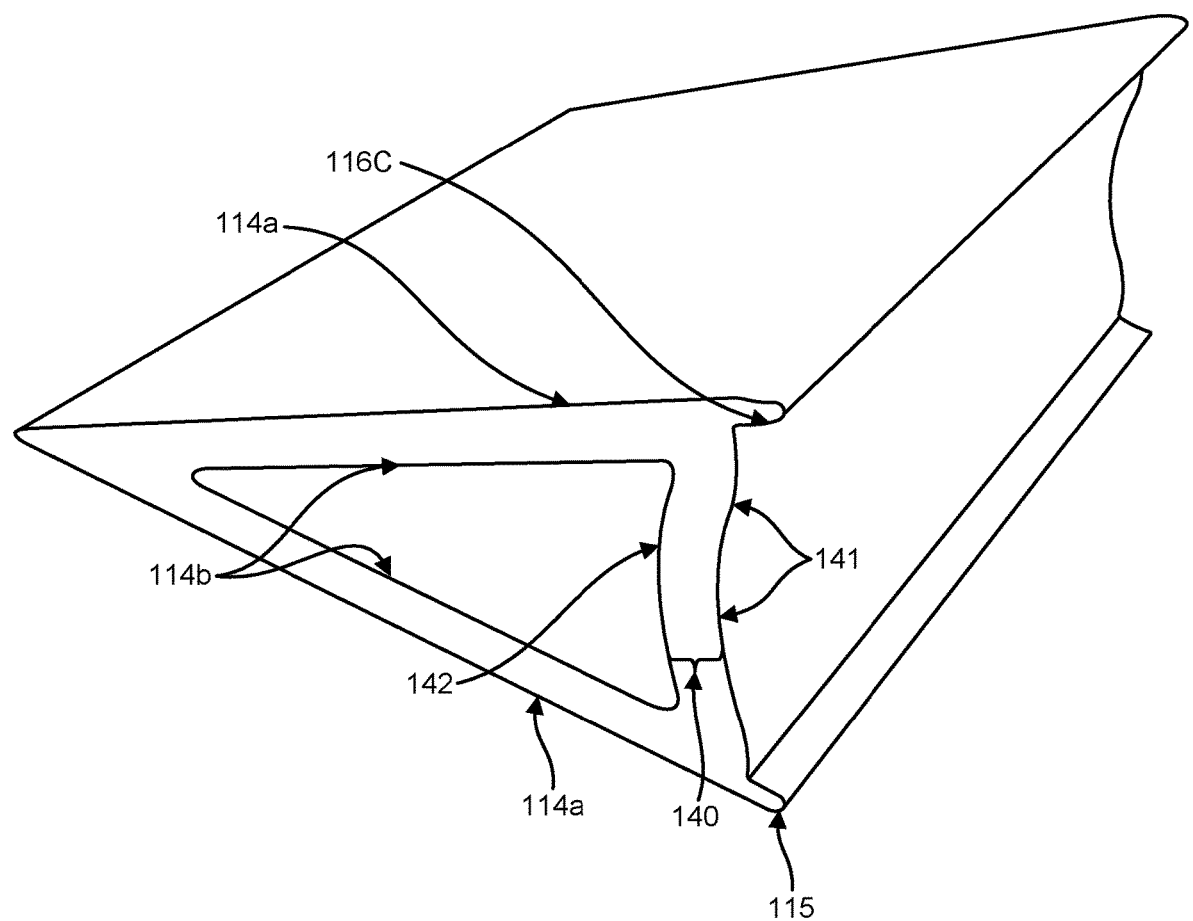
FIG. 3 is another perspective view of a V-shaped wedge laying sideways.

FIG. 3 is a close up end view of the V-shaped wedge 110. Each V-shaped wedge 110 is also comprised of a rectangular material 140 that is inserted at the top opening of each V-shaped wedge 110 that is slightly and concavely curved towards the bottom tip of the V-shaped wedge 110. The material 140 is approximately 0.170-0.271 inches thick; the outer wall 141 is approximately 1.420-1.440 inches wide and 47-49 inches long (the same length of the sidewalls 112); and the inner wall 142 is approximately 0.884-1.004 inches wide and 47-49 inches long. The material 140 is placed in between the opening of the V-shaped wedge 110 (i.e. between the non-connected ends of the side walls 112). The length of the longer sides of the rectangular material 140 is matched up with the longer sides of the non-connected sidewalls 112. The outer wall 141 of the material 140 extends out from the outer sidewall 114(a) towards the center of the V-shaped wedge 110 at a straight line for approximately 0.264-0.293 inches angled at approximately R0.010-R0.030 inches from the outer side wall 114 (*a*) right where the outer side wall 114 (*a*) connects to the wedge prongs 115. The outer wall 141 then arcs slightly and concavely towards the center of the V-shaped wedge 110 at an arc of approximately R1.320-R1.340 inches, for a length of approximately 0.794-0.994 inches, before extending back out in a straight line for approximately 0.264-0.293 inches and connecting to the opposite outer side wall 114(*a*) at an angle of approximately R0.010-R0.030 inches. The inner wall 142 connects with one of the inner side walls 114(*b*) at a radian of approximately R.040-R.060 inches. The inner wall 142 then curves slightly and concavely downward towards the center of the V-shaped wedge 110 as it extends out for a width of approximately 0.794-0.994 inches towards the opposite inner side wall 114(*b*); connecting to that inner side wall 114(*b*) at a radian of approximately R.040-R.060 inches. The radian of the concave arc of the inner wall 142 is approximately R1.507-R1.527 inches.

In other embodiments, the material 140 is made of different thickness, different arc degrees, and/or different series of continuous convex and/or parabolic curves depending on the type of ballistic and/or caliber of gun intended for the defense structure to resist.

In another embodiment, the material 140 is a hardened flat/rigid material with no arc and each V-shaped wedge is filled with a ballistic deflecting polymer. The V-shaped wedges 110 are spaced slightly apart from each other with slight gaps 130 between each V-shaped wedge 110. In yet another embodiment, the slight gaps 130 are approximately 0.0-0.50 inches wide.

Figure 4A:
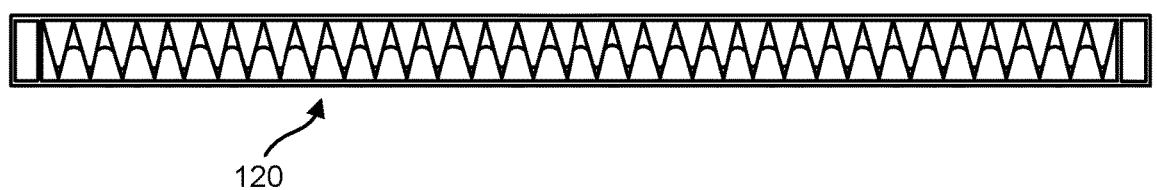
FIG. 4(a) is a perspective view of a V-Profile in a horizontal V row-type configuration.
Figure 4B:
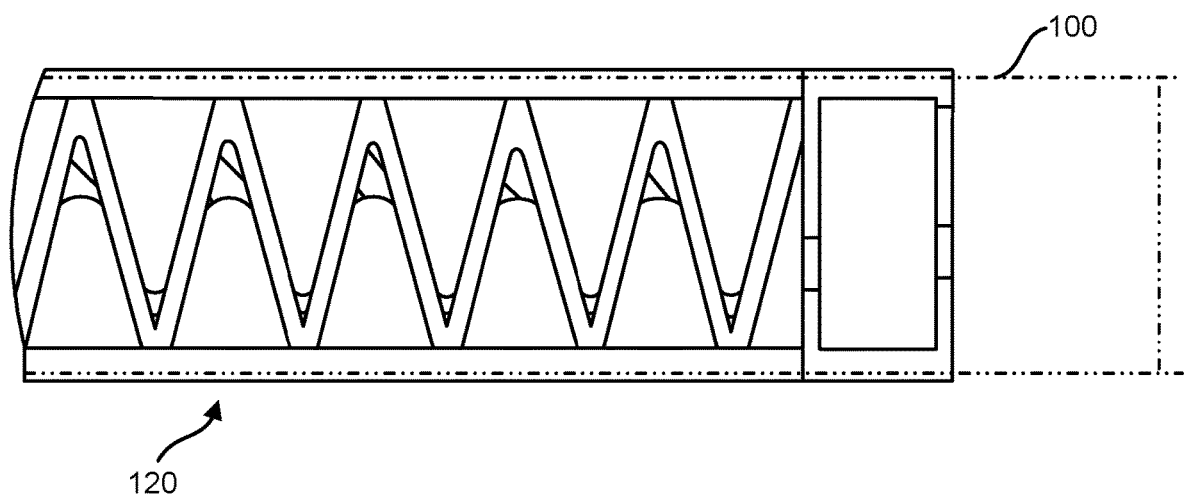
FIG. 4(b) is a zoomed in perspective view of 5 V-shaped wedges from the V-Profile pictured in FIG. 4(a)

The V-Profile 100 also comprises an outside ballistic receptor 120 of the profile that runs flush against and parallel to the length of the column of V-shaped wedges 110. FIG. 4(*a*) depicts an alternate body of the invention, wherein the V-shaped wedges are arranged side by side in a V row-type configuration. In an embodiment of the invention the ballistic defense structure comprises V-Profiles 100 comprising V-shaped wedges 110 wherein the outside receptor 120 is comprised of fiberglass ballistic materials.

In one embodiment of this invention, the material 140 at the top of each V-shaped wedge 110 is flat and lays parallel and flush against the outside receptor 120 as depicted in FIG. 4(*b*). A hardened material is placed on the top of each V-shaped 110 and the V-shaped wedge 110 is filled with filler materials such as polymers and polycarbons. Alternatively in another embodiment, the material 140 at the top of each V-shaped wedge 110 is concavely curved slightly towards the bottom tip of the V, as shown in FIG. 1, forming a slight hollow space 150 in between the outside receptor 120 and each V-shaped wedge 110. In an embodiment of this invention, the V-shaped wedges' 110 side walls 112 have the capability to flex or arc both concavely and convexly. In another embodiment, once the V-shaped wedges 110 are stacked or placed next to each other with a slight gap 130 between the wedge prongs 115, a considerable amount of material from the wedge prongs may fill up the junction or gap between each V-shaped wedge 110. See FIGS. 6(*a*) and 6(*b*). In an embodiment the slight gap 130 is approximately 0.0-0.50 inches wide.

Figures 5A, 5B:
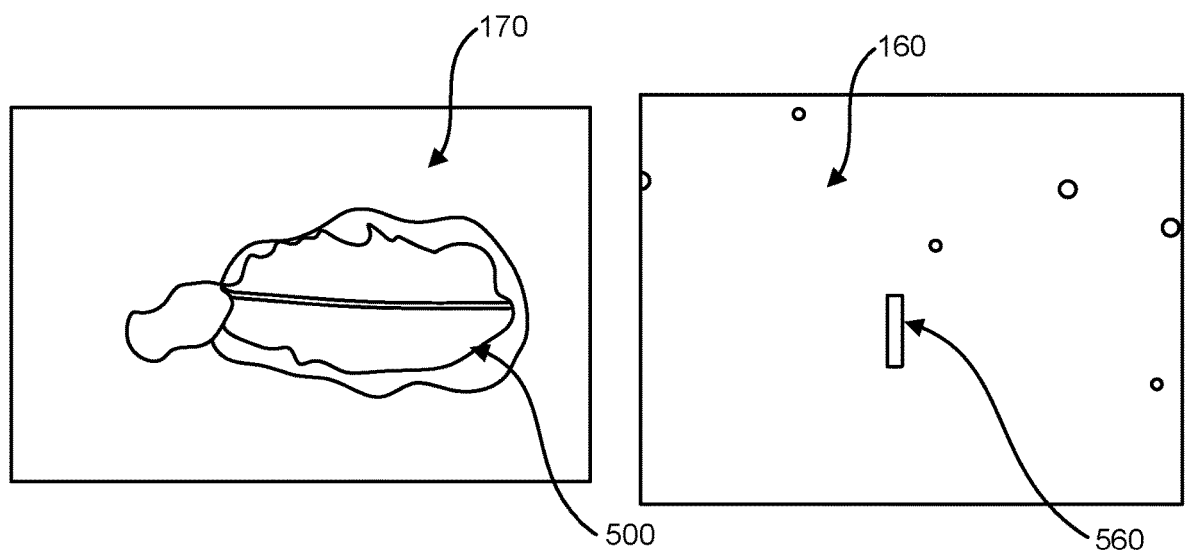
FIG. 5(a) depicts an interior wall showing a large entry hole of a shot.
FIG. 5(b) depicts an exterior of the wall in 5(a), showing the exit pattern when the V-profile is set up vertically in an V-column type configuration and the vertical alignment of the exit shot.
Figure 5C:
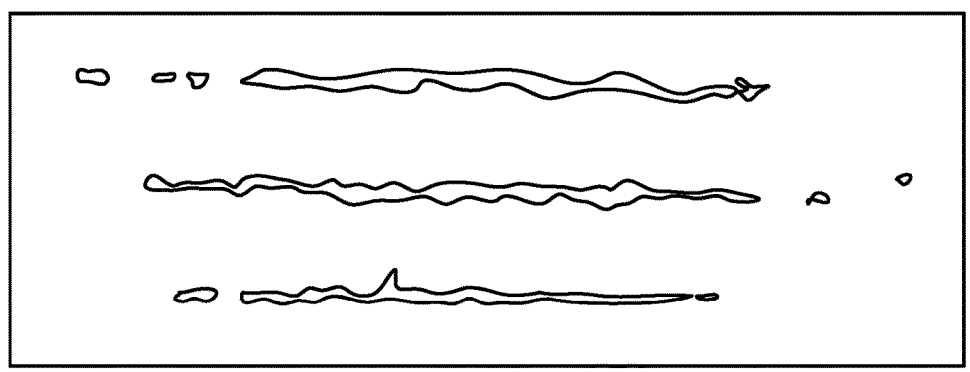
FIG. 5(c) depicts an exterior of the wall in 5(a), showing the exit pattern when the V-profile is set up horizontally in a V-row type configuration and the horizontal alignment of the exit shot.

In another embodiment of this invention, as shown in FIGS. 5(*a*) and 5(*b*), when a projectile is shot from a shotgun and impacts the interior V-shaped wedges side 170, towards and through the exterior outside receptor of the profile side 160, the side walls 112 of the V-shaped wedges 110 yield to the force of the projectile, creating wider gaps 130 for an immediate following projectile to pass through. When the projectile is expelled from the weapon, it strikes the V-shaped wedge side 170, penetrates the interior wall surface 170, and is immediately guided into the V columns or V rows 100 of V-shaped wedges 110 creating respective vertical 560 or horizontal rows of ballistics which can slip through the gaps 130 between the V-shaped wedges 110. In an embodiment of the invention, when the projectile pushes against the gap 130 and the adjoining side walls 112 yield to the force of the projectile, an effective gap 130, approximately 0.010-0.50 inches wide is created for the subsequent projectiles to pass through. In effect, the first line of shots 560 open the door for subsequent shots to pass through. These factors maximize the effective force of the following shot. In one embodiment, a 12 gauge shotgun is used on the inside 170 of the defense core 110 to fire through the core; and the 12 gauge shell has optimal capacities. In another embodiment, a 12 gauge shotgun using number 6-8 shot with a wide pattern discharge is optimal.

As shown in FIGS. 5(*a*) and 5(*b*), in another embodiment, when a projectile is shot from the V-shaped wedges side 170, towards and through the outside receptor of the profile side 160, the defense structure has a self-healing capability. The slight gaps 130, the entrance hole 500 in the V-profile 100 side, and the cavity and widened gap created by the projectile traveling through the defense structure, are all self-healing. The V profile 100 can also be referred to or used interchangeably with "the defense structure", the "V profile system", or the "Defense Structure System." One or more V profiles make up a defense structure. The V-profile 100 and the material that comprise it return to their pre-ballistic state sufficient to maintain effectiveness or became completely ballistic resistant again. A defense structure system 100, in the case of wall construction, has the ability to be constructed in standard 3'×4' smaller or larger modular component panels, thus, providing for quick and easy repairs, and or replacement as needed.

In an embodiment of the invention, the defense structure 100 is referred to as a Pro-Active Defense Structure because it enables a defendant to fire projectiles at an assailant standing on the other side of the Pro-Active Defense Structure, in a "one way" pattern, if the defendant actively chooses to. The effective use of the simple geometric shape of a V, placed side by side VVVV and then interlaced together, creates the geometry of the "One Way" ballistic resistant panel system 100. Use of Polymers and/or viscous materials placed within the external wedge of the V completes the critical "One Way" effect of the Pro-Active Defense Structure system. The defendant is able to pro-actively choose when they want to end a standoff with deadly force or disabling effects on their assailants. This action of the defendant shooting through the wall can be repeated over and over at the defender's option with little or no degradation to the structural integrity of the Pro-Active Defense Structure 100.

In addition, in other embodiments the Pro-Active Defense Structure is used for external panels of automobiles, trucks, armored vehicles, military vehicles, and aviation. Hijacking an armored car would be virtually impossible with the ability of the security agent inside the cargo area, no longer held captive, to shoot forward into a driver's area. Equipping the cockpit door of commercial airplanes with the Pro-Active system helps prevent the possible security breach of the cockpit. A small caliber weapon such as a .22 Caliber hand gun loaded with bird shot is effective to easily blind or disable the assailant, with the added value of dispersing its energy before perforating the outer wall of the pressure chamber. The low caliber weapon is effectively fired at an upward angle, greatly minimizing the danger to the crew or passengers.

In another embodiment of the present invention, a projectile fired at the outside receptor of the profile side 160, will be absorbed into the fiberglass material 120. The design of the V profile 100 further enhances the effectiveness of the fiberglass material 120. The walls 112 of the V-shaped wedges and the material 140 at the top of the V-shaped wedge 110 (i.e. the outer surface shapes of the V-shaped wedge 110) have the capabilities to remain flat/straight or flex and arc both concavely and convexly; serving to guide projectiles toward the center of the V-shape wedge 110. This provides for maximum energy absorption, which traps and stops the projectile within the viscous material or hollow void 114(*b*) and 142. In another embodiment, the side walls 112 have the ability to flex inward or outward depending on the direction of the projectile force, causing energy to be absorbed. In an embodiment, the slight convex hollow 150 under the fiberglass base 120, allows the fiberglass material to flex inward when the projectile energy strikes the material. This allows some of the projectile's energy to be absorbed decreasing the projectile's velocity. In another embodiment, when a projectile strikes outside receptor of the profile side 160, the fiberglass material 120 expands and pushes against the adjoining V-shaped wedges 110, closing the gap 130 thus expending some additional energy. In yet another embodiment, various thickness of fiberglass material 120 are used and the various fiberglass thickness are capable of absorbing various calibers and charge loads of typical ballistics (i.e. 7/16 inches thick material will absorb full metal jacket 9 mm forces).

Figure 6A:
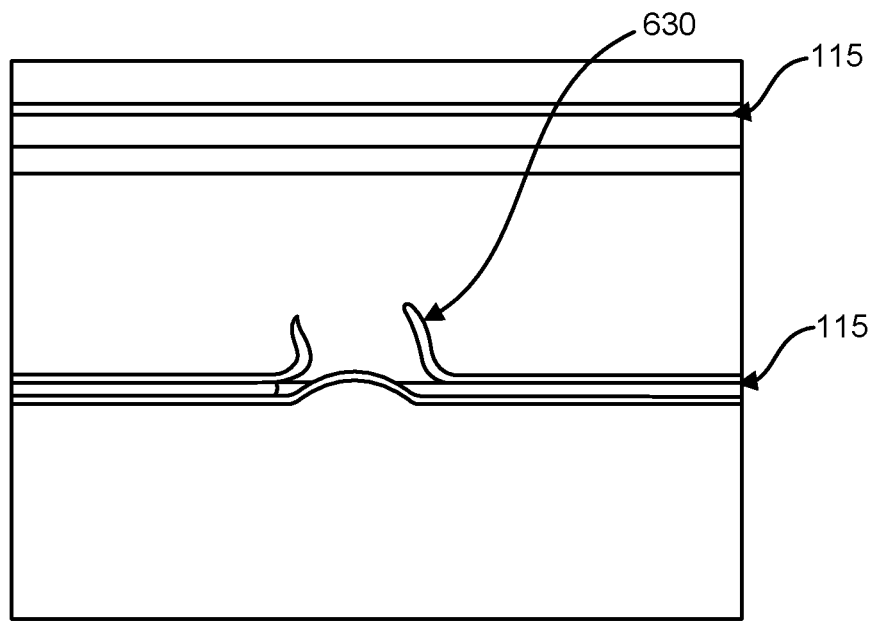
FIG. 6(a) depicts a two or more V-shaped wedges placed side by side with an obtrusion from being struck by a projectile.
Figure 6B:
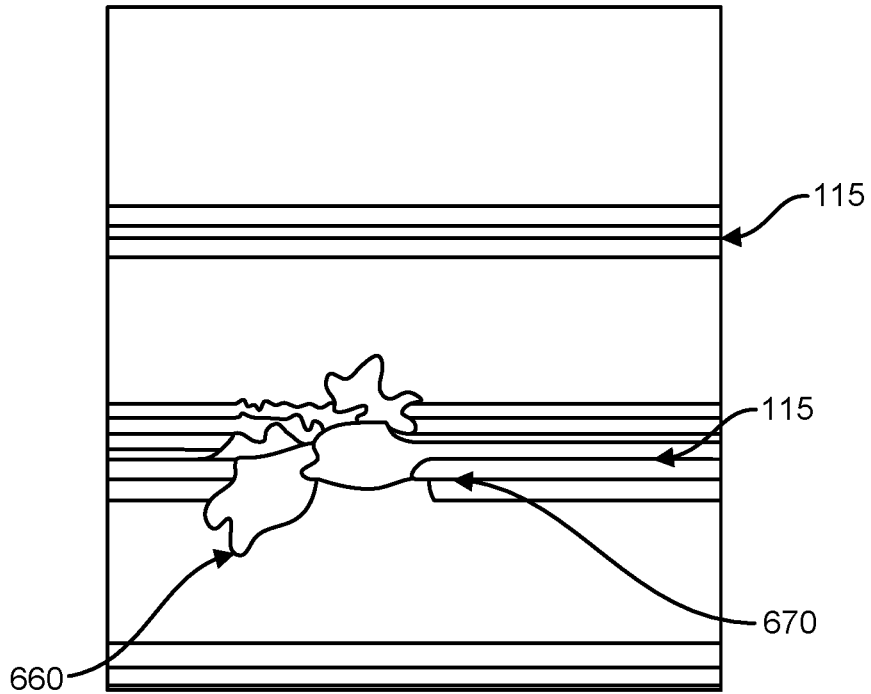
FIG. 6(b) depicts an exemplary projectile stop even with a dead center strike to a gap in the V profile.

In another embodiment of the present invention, a hard top 140 is placed at the top of the V-shaped 110 and, and is concavely curved towards the point/center of the V-shaped wedge 110, and forms a slight convex hollow 150 between the V-shaped wedge 110 and the outer receptor of the profile 120. This slight convex hollow allows the outside receptor of the profile to flex inward when a projectile strikes the receptor of the profile 120. This will allow some of the projectile's energy to be absorbed, decreasing its velocity. Additionally, as depicted in FIG. 6(*a*), when two or more V-shaped cavities 110 are placed side by side with a slight gap 130 in between the wedge prongs 115 of the two V-shaped wedges 110 110, a considerable amount of wedge prong/horn material is formed at the gap 130. This creates a high degree of resistance to penetration. In an embodiment, when a projectile shot from and towards the outer receptor side 160, strikes the V profile 100, at the gap 130 between the V-shaped wedges 110, the wedge prongs/protruding horns 115 redirect the projectile. In one embodiment, the wedge prongs 115 fold under pressure 630 and, thus, act as a sealing barrier at the gap 130. In another embodiment the shear mass of the adjoining V-shaped wedges 110 and the lateral pressures surrounding the V-shaped wedges 110 prevent full penetration. FIG. 6 depicts the folding effect again, with a first shot 660 and also with a second shot 670 which was a dead center strike at the V profile gap 130. In yet another embodiment, when a projectile strikes the outer receptor fiberglass material 120 anywhere not just dead center between the gaps 130, the material expands and pushes against the adjoining V-shaped wedges 110, closing the gap 130 and thus expending some additional energy of the projectile.

Figure 7:
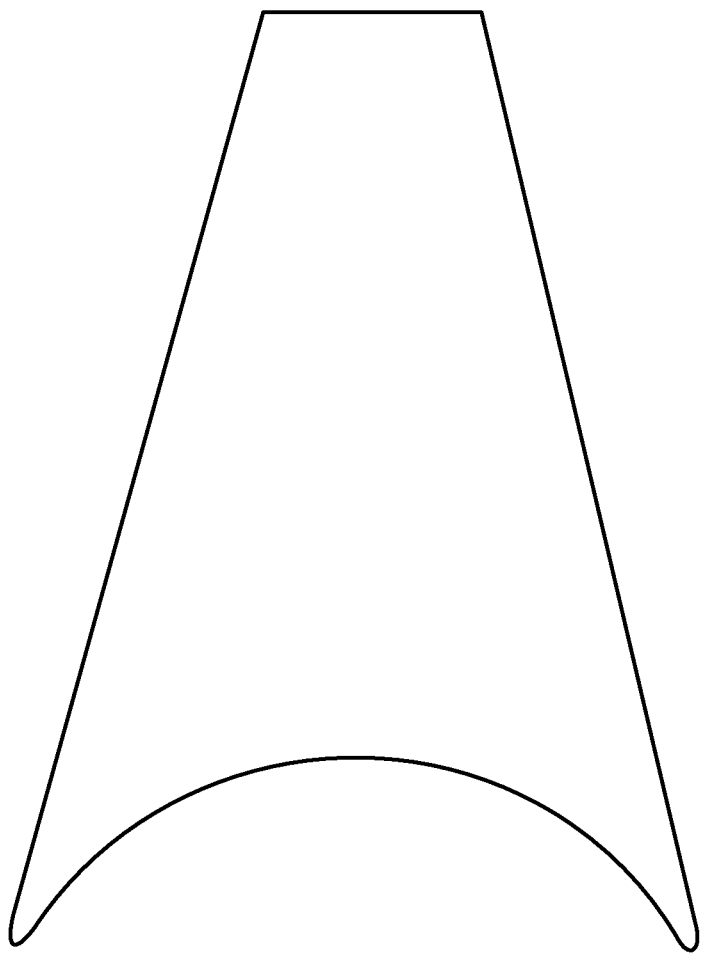
FIG. 7 is a perspective view of a hardened material insert used to deflect a projectile.
Figure 8A:
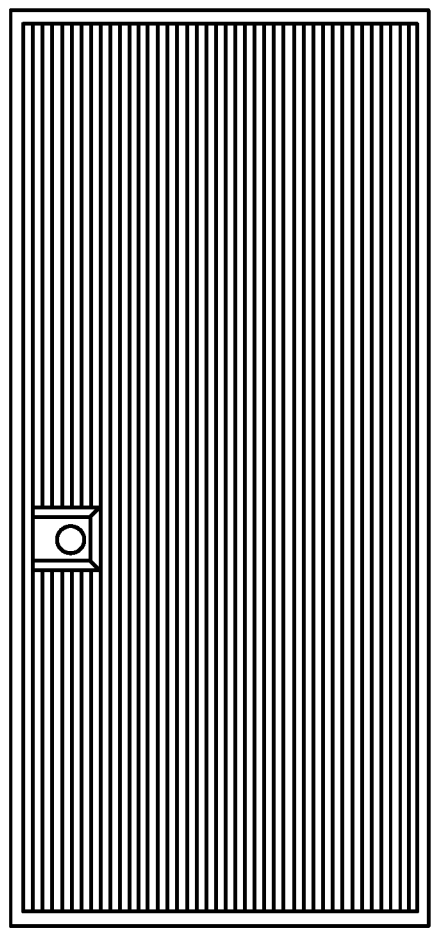
FIG. 8(a) depicts a door comprised of a ballistic resistant defense structure.
Figure 8B:
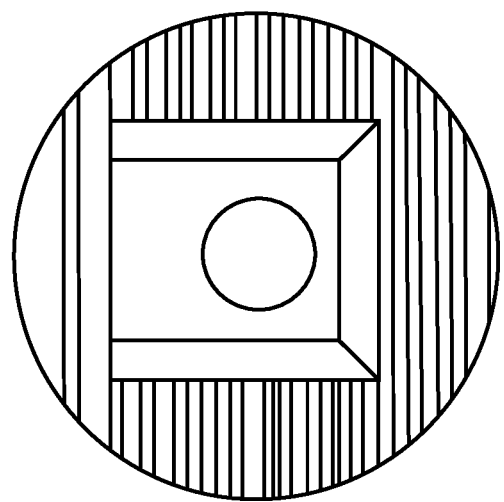
FIG. 8(b) depicts a zoomed in view of the ballistic resistant defense structure details on the door depicted in FIG. 4.

In another embodiment of the present invention, ballistic or other projectiles are deflected from the defense structure rather than absorbed. A hardened rectangular material 140 is placed in the outer V wedge connecting the longer sides of the rectangular material 140 to the longer free sides of the sidewalls 112 and filler materials like polymers, polycarbons, or hardened metal materials are formulated and used to deflect the incoming projectiles that are shot from the outer receptor side 160 towards the v-shaped wedge side 170. In another embodiment of the present invention a hardened material 700 as depicted in FIG. 7 is inserted into the cavity or hollow of the V-shaped wedges 110. In yet another embodiment, the hardened rectangular material 140 is removed and just the hardened material 700 is inserted into the cavity or hollow of the V-shaped wedges 110. The hardened material 700 is configured to deflect incoming projectiles. A positive outcome of deflecting the projectile is that certain projectiles will ricochet back towards the assailant, creating the chance that a projectile will ricochet into the assailant causing them to cease fire. In another embodiment when the assailant increases the rate of fire, the ricocheted projectiles will bring more devastation to the assailant and/or their allies standing nearby.

In yet another embodiment of the invention, it is recommended that the ballistic resistant defense structure be replaced after being shot at once or after going through repeated back and forth fire.

Having described the disclosed subject matter, what is claimed as new and desired to be secured by Letters Patent is:

1. A method of configuring a defense structure, which comprises:
    arranging a defense structure comprising a plurality of V profiles; wherein the plurality of V profiles comprising:
        a first side comprising a plurality of V-shaped wedges arranged adjacent to each other; wherein each of the plurality of V-shaped wedges comprising a top opening;
        a second side; and
        a plurality of slight gaps disposed between the plurality of V-shaped wedges;
    configuring a wall surface proximate one of the first side or the second side;
    configuring the plurality of V-shaped wedges to guide a first projectile through one of the plurality of slight gaps when the first projectile is directed towards the first side;
    configuring the plurality of V-shaped wedges to guide a second projectile into the top opening of one of the plurality of V-shaped wedges when the second projectile is directed towards the second side; and
    configuring the plurality of V-shaped wedges to return to a pre-ballistic state after the first projectile is guided through one of the plurality of slight gaps.

2. The method of claim 1, wherein the plurality V-shaped wedges disposed in a horizontal V row-type configuration.

3. The method of claim 2, wherein the first projectile comprises a plurality of shot; whereby the plurality of shot forms a horizontal exit pattern.

4. The method of claim 1, wherein the plurality of V-shaped wedges disposed in a vertical V column-type configuration.

5. The method of claim 4, wherein the first projectile comprises a plurality of shot; whereby the plurality of shot forms a vertical exit pattern.

6. The method of claim 1, wherein each of the plurality of slight gaps is approximately greater than 0.0-0.50 inches wide.

7. The method of claim 1, wherein one of the plurality of slight gaps widens to approximately 0.010-0.50 inches after the first projectile is guided through the one of the plurality of slight gaps.

8. The method of claim 1, wherein the second side comprises an outside receptor disposed parallel to a length of the plurality of V-shaped wedges.

9. The method of claim 8, wherein a fiberglass ballistic material is set within the outside receptor.

10. The method of claim 1, wherein a material is disposed within the top opening; the material configured to adsorb the second projectile and prevent the second projectile from penetrating the defense structure.

11. The method of claim 10, wherein the material comprises a viscous material.

12. The method of claim 1, wherein each of the plurality of V-shaped wedges further comprises:
   two side walls;
   a material disposed between the two side walls; and
   two wedge prongs extending outwardly from the two side walls.

\* \* \* \* \*